Dec. 5, 1961     F. A. VERGA ET AL     3,011,851

SPLIT LOCKING HANDLE

Filed Feb. 6, 1959

INVENTORS
FRANK A. VERGA
JACK RUFFOLO
BY Benjamin G. Weil

ATTORNEY

United States Patent Office 3,011,851
Patented Dec. 5, 1961

3,011,851
SPLIT LOCKING HANDLE
Frank A. Verga, Denver, and Jack Ruffolo, Littleton, Colo., assignors to Martin-Marietta Corporation, a corporation of Maryland
Filed Feb. 6, 1959, Ser. No. 791,595
8 Claims. (Cl. 312—320)

This invention relates to cabinet structures wherein the movable component is provided with a fixed handle having biasing means. More particularly, this invention relates to a latching element adapted to releasably lock a radio chassis in a support structure, so that the chassis may be readily inserted in and removed from the support structure in one continuous action.

Large complexes of electrical equipment are commonly assembled in units on individual chassis which may be separately inserted in or removed from a support structure or receiving frame by means of one or more handles. When the frame is subject to forces tending to eject the chassis therefrom, such as are experienced on a sea vessel or in an airplane, means for securing the chassis must be provided. Locking means have sometimes been incorporated in prior art chassis handles. These devices are generally limited in that the handle must be partially disengaged from the chassis during the locking or unlocking operations, so that the chassis cannot be safely removed from its frame until the handle has been reengaged. This operation and the accompanying waste motion are subsequently mirrored when the chassis is reinserted. Also, in handling the chassis, it is possible for the handle to become accidentally disengaged, which might result in serious damage.

It is a purpose, therefore, of the present invention to provide a latch handle which affords the user a constantly fixed means of wielding the chassis, so that it may be lockingly inserted and engaged in and unlockingly removed and disengaged from its receiving frame in one continuous action.

As will hereinafter be illustrated and described in detail, a handle or gripping member is rigidly affixed to the front panel of a radio chassis. Pivoted on the handle is a lever, one arm of which is operable by the user, the other being provided with a generally hook-shaped portion movable between a retracted position and an extended position by operation of the lever. A projecting member on the chassis frame, such as a slotted lug, is adapted to slidably receive the hook upon insertion of the chassis. Subsequent inward pivoting of the lever operating arm then causes the hook to extend into engagement with the lug and cam in the slot, thereby latching the chassis in place. A releasable catch associated with the handle and the lever prevents outward movement of the latter, so that the chassis is effectively locked against accidental disengagement.

The chassis may be unlocked by releasing the catch and pulling on the chassis handle. As the chassis is forced out, the hook again cams with the aforesaid slot in a disengaging direction, and the lever is displaced outwardly away from the handle, leaving the handle available for removing the chassis from the chassis frame. The chassis may be removed from the frame in one continuous motion since, after the catch has been released, for example, by the thumb of the user, disengagement is effected by simply pulling outwardly on the handle.

Should the chassis initially be stuck in the frame, it may be started by releasing the catch and pulling the operating arm of the lever outwardly. This will cam the hook against the lug on the chassis frame, and force the chassis out of engagement.

For a better understanding of the invention, reference is made to the following description and drawing wherein.

Figure 1:
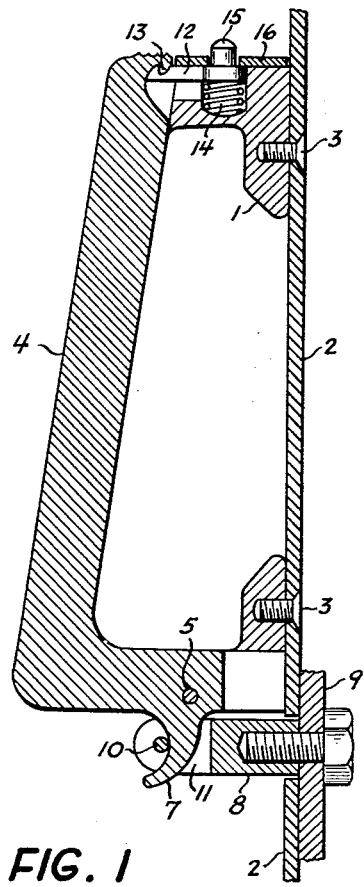
FIGURE 1 is a cross-sectional side elevation of the preferred embodiment of the present combination handle and lever arrangement, which is shown secured to the front panel of a radio chassis (not shown) and in locking relation with the chassis support structure.
Figure 2:
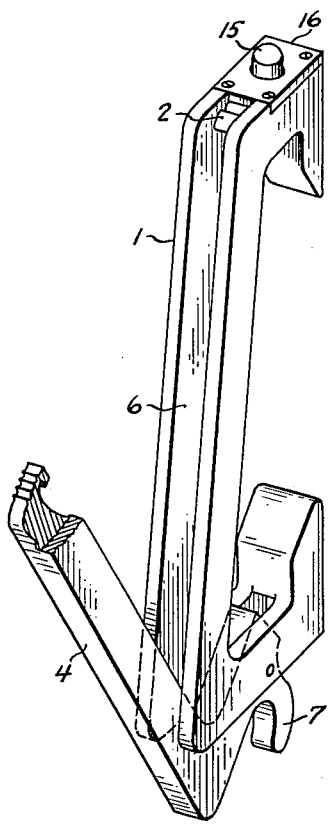
FIGURE 2 is a perspective view of the combination handle and lever shown in FIGURE 1.

In accordance with the present invention as shown in the embodiment of FIGURES 1 and 2, a split handle 1 is rigidly secured to the front panel 2 of a ratio chassis (not shown) by screws 3 or other suitable means. A substantially L-shaped lever 4 constituting a movable handle portion is pivoted near the end of its short arm by means of a pin 5 passing through fixed handle portion 1. Handle 1 is slotted as at 6 to receive lever 4 in flush relation, and permit the short arm of lever 4 to move between a retracted position (as in FIGURE 1) and an extended position (as in FIGURE 2).

Near its pivotal point, lever 4 is provided with a hook or cusp-shaped latch 7. A lug or latch-receiving member 8 projecting from chassis frame 9 is adapted to slidably engage latch 7 when lever 4 is inwardly pivoted, the front of lug 8 being formed with an indent bridged by pin 10 so as to form a slot 11 into which latch 7 may be received.

To prevent panel 2 and its associated chassis from accidentally sliding out of support 9, a catch or locking means on handle 1 holds lever 4 against movement when hook 7 is engaged with lug 8. The catch comprises a catch member 12 having a groove engageable with lever 4 as at 13, the catch being resiliently biased into an engaging position with lever 4 by means of spring 14. A button 15 on catch member 12 extends outwardly from a retaining plate 16 fastened to the top of handle 1, so that the catch may be manually disengaged by the operator's thumb.

In order to unlock and remove panel 2 and its associated chassis from support structure 9, button 15 is depressed to disengage locking member 12 from lever 4. At the same time, handle 1 is pulled outwardly from support 2 causing hook 7 to disengage from pin 10 in slot 11 and from slot 11 through camming action and displacing lever 4 toward its unengaged position. The chassis may then be completely removed from support 9 by means of handle 1.

When the chassis is stuck in frame 9, it may be started by grasping the long arm of lever 4 after disengaging locking member 12, and pulling the arm outwardly so as to retract hook 7 from lug 8. The camming action of hook 7 in slot 11 forces panel 2 and its associated chassis to break from frame 9, thereby freeing the chassis.

When inserting the chassis into frame 9, lever 4 is maintained in its retracted position until panel 2 has been almost fully inserted. Lever 4 is then pushed into its engaging position whereby hook 7 is slidably inserted in slot 11, causing panel 2 to be displaced into its fully inserted position. Lever 4 is simultaneously engaged by locking member 12, which holds lever 4 in its engaged position, so as to lock panel 2 and its associated chassis in support 9.

Although a preferred embodiment of the present invention has been described, it will be understood that modifications may be made within the spirit and scope of the appended claims.

We claim:

1. A handle structure for selectively locking a removable chassis in a receiving frame provided with an external latch, and for facilitating removal of the chassis from the frame, said handle arrangement comprising a fixed handle secured to said chassis, a lever mounted for movement with respect to said handle, said lever having a handle portion closely conforming to the contour of said handle throughout a substantial portion of the length of said handle, and a latch-engaging portion operated by selective movements of said handle portion of said lever to releasably engage said latch when said chassis is inserted in said frame, and a catch associated with said lever and said handle for releasably retaining said lever when said latch-engaging portion is engaged with said latch, thereby locking said chassis in said frame, said handle, when said lever has been disengaged from said latch, being available to permit firm grasp of said chassis for the purpose of removal from said frame.

2. A handle structure for selectively locking a removable chassis in a receiving frame and for facilitating removal of said chassis therefrom, said handle arrangement comprising a fixed handle secured to said chassis, a lever pivoted on said handle having a generally hook-shaped portion, a lug on said frame adapted to slidably receive said hook-shaped portion in interlocking relation when said chassis is inserted in said frame, said lever having a handle portion for selectively moving said hook-shaped portion into and out of engagement with said lug, said handle portion being configured to closely conform to the contour of said fixed handle when said hook-shaped portion is engaging said lug, and a catch cooperating with said lever mounted on said handle for releasably latching said lever when said hook-shaped portion is engaging said lug, thereby keeping said chassis locked in said frame.

3. In a handle arrangement for selectively locking a removable chassis in a receiving frame and for facilitating removal of said chassis therefrom, wherein a fixed handle mounted on said chassis is adapted to cooperate with a latch disposed on said frame, the improvement comprising a lever mounted within said handle adapted to releasably engage said latch when said chassis is inserted in said frame, a complementary recess formed in said handle for the reception of said lever when in the engaged position, extension structure affixed to the upper end of said lever bearing a latch structure and spring-loaded catch means mounted on said handle engaging said latch for releasably retaining said lever when positioned within said handle.

4. A handle structure for a removable chassis for selectively locking the chassis in a receiving frame, and for serving on occasion as a firm grasping means for the removal of the chassis from the frame, comprising a fixed handle portion to be grasped by an operator during removal of a chassis, and a movable handle portion pivoted thereto and normally substantially coinciding with said fixed handle portion, a latch on said movable handle portion arranged to serve a chassis-locking function, a latch-receiving member associated with a receiving frame and engageable by said latch, said latch being moved out of engagement with said latch-receiving member when said movable handle portion has been rotated a substantial number of degrees away from said position of substantial coincidence with said fixed handle portion, said movable handle portion and latch thereby effectively serving as a locking means for a chassis, whereas said fixed handle portion continuously remains in a position to support the weight of a chassis.

5. The handle structure as defined in claim 4 in which manually releasable locking means are provided for normally retaining said movable handle portion in said position of substantially coincidence with said fixed handle portion.

6. The handle structure as defined in claim 4 in which said fixed handle portion contains a slot extending a substantial portion of its length, and said movable handle portion is of a dimension to fit in said slot and thereby reside substantially entirely within the confines of said fixed handle portion when said movable handle portion has been moved to said position of substantial coincidence.

7. A handle structure for a removable chassis for selectively locking the chassis in a receiving frame, and for serving on occasion as a firm grasping means for the removal of the chassis from the frame, comprising a fixed handle portion of a dimension suitable to be grasped by the hand of an operator during removal of a chassis, and a movable handle portion pivoted thereto and normally substantially coinciding with said fixed handle portion, a manually releasable locking means for normally retaining said movable handle portion in said position of substantial coincidence with said fixed handle portion, a latch mounted on the opposite side of the pivot from said movable handle portion and operable thereby to serve a chassis-locking function, a latch-receiving member associated with a receiving frame and engageable by said latch, said latch being moved out of engagement with said latch-receiving member when said movable handle portion has been rotated a substantial number of degrees away from said position of substantial coincidence with said fixed handle portion, said movable handle portion and latch thereby effectively serving as a locking means for a chassis, whereas said fixed handle portion continuously remains in a position to support the weight of a chassis.

8. The handle structure as defined in claim 7 in which said latch is generally hook shaped, with a camming surface thereon to bear against a portion of said latch-receiving member when said movable handle portion is rotated away from said position of coincidence with said fixed handle portion, thereby to serve a break-away function to free a chassis from its receiving frame.

References Cited in the file of this patent

UNITED STATES PATENTS

| 2,609,268 | Nye | Sept. 2, 1952 |
| 2,861,859 | Newcomer | Nov. 25, 1958 |
| 2,897,033 | Ford | July 28, 1959 |
| 2,926,056 | Newcomer et al. | Feb. 23, 1960 |
| 2,944,864 | Krivulka | July 12, 1960 |

FOREIGN PATENTS

| 148,223 | Switzerland | July 15, 1931 |
| 950,638 | France | Oct. 3, 1949 |